United States Patent
Wyderski

(10) Patent No.: US 12,341,400 B2
(45) Date of Patent: Jun. 24, 2025

(54) MANIFOLD ASSEMBLY FOR A FLUID COOLED GENERATOR

(71) Applicant: C.E. Niehoff & Co., Evanston, IL (US)

(72) Inventor: Lukasz Wyderski, Franklin Park, IL (US)

(73) Assignee: C.E. Niehoff & Co., Evanston, IL (US)

( * ) Notice: Subject to any disclaimer, the term of this patent is extended or adjusted under 35 U.S.C. 154(b) by 488 days.

(21) Appl. No.: 17/703,600

(22) Filed: Mar. 24, 2022

(65) Prior Publication Data
US 2023/0307980 A1    Sep. 28, 2023

(51) Int. Cl.
| H02K 5/20 | (2006.01) |
| H02K 1/20 | (2006.01) |
| H02K 9/19 | (2006.01) |
| H02K 11/05 | (2016.01) |

(52) U.S. Cl.
CPC .............. *H02K 5/203* (2021.01); *H02K 1/20* (2013.01); *H02K 9/19* (2013.01); *H02K 11/05* (2016.01)

(58) Field of Classification Search
CPC ............ H02K 1/20; H02K 5/203; H02K 9/19; H02K 9/1105
See application file for complete search history.

(56) References Cited

U.S. PATENT DOCUMENTS

| 4,484,049 A | 11/1984 | Ahner et al. |
| 4,922,148 A | 5/1990 | Kitamura |
| 5,040,493 A | 8/1991 | Gajewski et al. |
| 5,293,089 A * | 3/1994 | Frister .................... H02K 5/203 310/64 |

(Continued)

FOREIGN PATENT DOCUMENTS

| CN | 110022035 A | 7/2019 |
| DE | 3603423 A1 | 8/1987 |

(Continued)

OTHER PUBLICATIONS

Tanguy Davin, et al. Experimental Study of Oil Cooling Systems for Electric Motors, https://www.sciencedirect.com/science/article/abs/pii/S1359431114009314?via%3Dihub, visited Jun. 26, 2021.

(Continued)

*Primary Examiner* — Jue Zhang
(74) *Attorney, Agent, or Firm* — Banner & Witcoff, Ltd.

(57) ABSTRACT

A concentric manifold ring assembly comprises an internal distribution manifold for a generator. The manifold is for use in a direct-liquid-cooled alternator together with a mating housing to form a concentric fluid distribution channel that enables the transport and distribution of chilled coolant from a heat exchanger to select locations in the alternator via channels, ducts, and jets. The external heat exchanger feeds chilled coolant through a feed port where the incoming fluid is directed circumferentially via a channel formed by the manifold body and housing. From the circumferential flow, streams of coolant flow from drilled jet ports, while the circumferential flow back-cools rectifier mounting surfaces. Fluid flows flowing axially out of ducts to create an active end-to-end circulation of chilled fluid within the alternator to absorb thermal energy from alternator components before being drawn out of a return flow channel via a return flow port.

19 Claims, 11 Drawing Sheets

(56) References Cited

U.S. PATENT DOCUMENTS

| | | | |
|---|---|---|---|
| 6,674,188 B2 | 1/2004 | Yockey et al. | |
| 6,680,552 B2 | 1/2004 | Linden et al. | |
| 8,487,500 B2 | 7/2013 | Cullen et al. | |
| 10,186,933 B2 | 1/2019 | Roberts | |
| 2008/0224551 A1 | 9/2008 | Saban et al. | |
| 2009/0261668 A1 | 10/2009 | Mantere | |
| 2014/0246932 A1* | 9/2014 | Chamberlin | H02K 5/203 310/54 |

FOREIGN PATENT DOCUMENTS

| | | |
|---|---|---|
| DE | 4104740 A1 | 8/1991 |
| DE | 19854466 C1 | 4/2000 |
| DE | 10302572 A1 | 8/2003 |
| DE | 102006035696 A1 | 2/2008 |
| GB | 2519500 A | 4/2015 |
| GB | 2557635 A | 6/2018 |
| JP | H0698511 A | 4/1994 |
| JP | 5374902 B2 | 12/2013 |
| KR | 102010301 B1 | 8/2019 |
| KR | 1020180134348 A | 5/2020 |
| WO | 9109445 A1 | 6/1991 |

OTHER PUBLICATIONS

Zhengyu Liu, et al. Direct Coil Cooling of A High Performance Switched Reluctance Machine (SRM) for EVHEV Applications, Saw Int. J. Alt. Power, vol. 4, Issue 1 (May 2015), visited Jun. 26, 2021.

Dong Hyun Lim, et al. Thermal Performance of Oil Spray Cooling System for In-wheel Motor in Electric Vehicles, https://www.sciencedirect.com/science/article/abs/pii/S1359431113008612?via%3Dihub, visited Jun. 26, 2021.

Samuel Santos Borges, et al. Design of Water Cooled Electric Motors Using CFD and Thermography Techniques, 978-1-4244-1736-0/08/$25.00 © 2008 IEEE, visited Jun. 26, 2021.

Mircea Popescu, et al.I Modern Heat Extraction Systems for Electrical Machines—A Review, 978-1-4799-8900-3/15/$31.00 © 2015 IEEE, visited Jun. 26, 2021.

Christian Jungreuthmayer, et al. A Detailed Heat and Fluid Flow Analysis of an Internal Permanent Magnet Synchronous Machine By Means of Computational Fluid Dynamics, IEEE transactions on industrial electronics, vol. 59, No. 12, Dec. 2012, visited Jun. 26, 2021.

Zhe Huang, et al. Direct Oil Cooling of Traction Motors in Hybrid Drives, https://www.researchgate.net/publication/241628993_Direct_oil_cooling_of_traction_motors_in_hybrid_drives, visited Jun. 26, 2021.

Aug. 22, 2023—(GB) Combined Search and Examination Report—App 2304381.3.

Apr. 4, 2024—(DE) 1st Office Action—App 102023107337.0.

Apr. 11, 2024—(GB) Examination Report—App 2304381.3.

Aug. 16, 2024—(CA) 1st Office Action—App 3,193,942.

* cited by examiner though the other end to overheat through fluid starvation. Additional operating challenges to direct fluid cooling include the presence or formation of interior 'hotspots' and/or the formation of stagnant pockets of coolant within a unit's housing. Localized hotspots are a threat to temperature sensitive electrical components such as rectifiers, causing premature failure of such components. Further, stagnant pockets induce stator thermal soak before full cooling output potential can be achieved. Both localized hotspots and localized stagnation pockets benefit little from the coolant distribution offered via shaft fling or spray. Therefore, a need has been recognized for improved direct fluid cooling methods and/or fluid distribution within an alternator housing.

MANIFOLD ASSEMBLY FOR A FLUID COOLED GENERATOR

FIELD OF THE INVENTION

This application relates generally to electrical generators for vehicles and more particularly to a manifold assembly that facilitates efficient distribution of a cooling fluid within an interior of an electrical generator of a vehicle.

BACKGROUND

Electrical devices and devices containing multiple electrical components have become increasingly prevalent in vehicular power systems, thus increasing electrical power requirements of the vehicle. Vehicular power systems include a rotating electrical machine (e.g., an alternator) to supply the electrical energy to charge batteries and/or to otherwise provide power to the electrical devices connected to vehicular electrical system. Often, the vehicular alternators may utilize a ventilation or cooling system to pass air over an exterior surface of the alternator and/or through the alternator. Such alternators may include a rotor and shaft extending through the center of the rotor. In some cases, a shaft-end may be mechanically coupled (e.g., via a drive pully arrangement) to transfer rotational movement of the vehicle's engine to rotate the alternator's rotor and cause the alternator to generate electricity. To cool the alternator, the vehicle may include a fan that may or may not be coupled to the rotor to provide a cooling airflow over the exterior surface and/or interior surface of the alternator. Because such fans are often driven at the same speed as the rotor, alternator cooling may be limited by the speed of the engine's rotation. Additionally, alternators are located within a vehicular cavity (e.g., an engine compartment), that may have limited airflow and one or more other heat-generating components, such as the engine, co-located within the confined space of the vehicular cavity. To overcome such limitations, fluid cooling of vehicular generators has become more common.

Presently, fluid cooling of alternators may commonly refer to several distinct cooling approaches. For example, a first approach may include indirect fluid cooling methods, such as by incorporating a "water jacket" around an exterior surface of the alternator. Water jackets are typically less efficient for removing waste heat because of the longer cooling paths required. Additionally, the water jackets may also increase the size of the alternator, which may not fit within an available vehicular cavity for mounting the alternator. A second approach may include direct methods of spraying or splashing the cooling fluid onto the motor windings. Direct fluid cooling methods may provide enhanced heat dissipation, primarily from the interaction of the coolant (e.g., oil) with portions of the alternator generating heat (e.g., the windings).

Although current direct fluid cooling is typically more efficient than indirect cooling, there are inherent design hurdles that must be overcome to make it viable in an alternator application. For example, a major operating obstacle facing direct fluid cooling is the need to effectively distribute varying flow rates of fluid (e.g., a 'chilled' dielectric coolant) regardless of unit orientation. Solely relying on the rotating assembly to fling coolant leaves the unit vulnerable to overheating via slosh-induced coolant starvation. An illustrative example involves a direct-cooled alternator mounted in a vehicle that is scaling a hill. The incline of the hill naturally causes all of the coolant to pool on one end,

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome the above-noted problems, a need has been recognized for providing a manifold assembly to specifically target removal of localized hotspots and to provide an active end-to-end flushing effect of fluid within the alternator housing to prevent stagnation and/or starvation in all operating orientations. Additionally, the manifold assembly fits within existing alternator housings to provide more effective cooling without increasing the footprint or size of the alternator housing.

A concentric manifold ring assembly (e.g. an internal fluid distribution manifold) may be intended for use in a direct fluid (or liquid) cooled alternator and operates together with a mating 'shell' (e.g., an alternator housing) to form one or more concentric fluid distribution channels. The manifold ring assembly enables the transport and distribution of chilled coolant received from an exterior heat exchanger system to select internal locations within the alternator housing, such as via channels, ducts, and/or jets. Advantages of the concentric manifold ring assembly include providing a means to distribute incoming (e.g., chilled) coolant throughout the alternator interior, thus ensuring a direct-splash cooling effect can sufficiently collect thermal energy across a wide range of unit orientations. Further, the concentric manifold ring assembly may include an optimally located return/discharge channel to ensure a constant return supply of coolant to an external pump and heat exchanger of the heat exchanger system across a wide range of unit orientations. Further the concentric manifold ring assembly provides a compact concentric design that packages tightly into the alternator body, includes lightweight construction, and includes inherent vibration resiliency. An alternator incorporating the concentric manifold ring assembly may maintain a same diameter as an equivalent air-cooled alternator. Components of the concentric manifold ring assembly may be easily manufacturable via standard machining, extrusion, and/or casting techniques. Further, the concentric manifold ring assembly is provided in a form tailored for use in traditional production line assembly procedures utilizing basic hand and pneumatic tools. Further installation and/or repair processes are simplified with the modular design of the concentric manifold ring assembly, which enables simple installation or extraction as a complete assembly.

The details of these and other aspects of the disclosure are set forth in the accompanying drawings and description below. Other features and advantages of aspects of the disclosure will be apparent from the description and drawings.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps may be optional. It will also be appreciated with the benefit of this disclosure that one or more components illustrated in the accompanying figures may be positioned in other than the disclosed arrangement and that one or more of the components illustrated may be optional, in which.

DETAILED DESCRIPTION

In the following description of various example structures and methods in accordance with the invention, reference is made to the accompanying drawings, which form a part hereof, and in which are shown by way of illustration various fitness devices and systems using fitness devices in accordance with various embodiments of the invention. Additionally, it is to be understood that other specific arrangements of parts and structures may be utilized and structural and functional modifications may be made without departing from the scope of the invention.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof, as well as additional items and equivalents thereof. As used in this description, a set refers to a collection of one or more elements.

A concentric manifold ring assembly comprises an internal distribution manifold for a generator. The manifold is for use in a direct-liquid-cooled alternator together with a mating housing to form a concentric fluid distribution channel that enables the transport and distribution of chilled coolant from a heat exchanger to select locations in the alternator via downstream channels, ducts, and jets. The external heat exchanger feeds chilled coolant through a feed port where the incoming fluid is directed circumferentially via a channel formed by the manifold body and housing. From the circumferential flow, streams of coolant flow from drilled jet ports, while the circumferential flow back-cools rectifier mounting surfaces. Fluid flows axially out of high-mounted ducts to the other side of the main stator, creating an active end-to-end circulation of chilled fluid within the alternator to absorb thermal energy from alternator components before being drawn out of a return flow channel via a return flow port. This end-to-end fluid circulation is discussed in greater detail below, with respect to FIG. 10. Additionally, the concentric manifold ring assembly allows a flow channel that feeds the return flow port to be positioned near or otherwise adjacent to an axial center of the alternator. This positioning of the return flow port near the axial center of the alternator ensures that the return flow channel remains submerged throughout each operating orientation of the vehicle (e.g., an uphill orientation, a downhill orientation, etc.) in which the alternator is installed.

Figure 1:
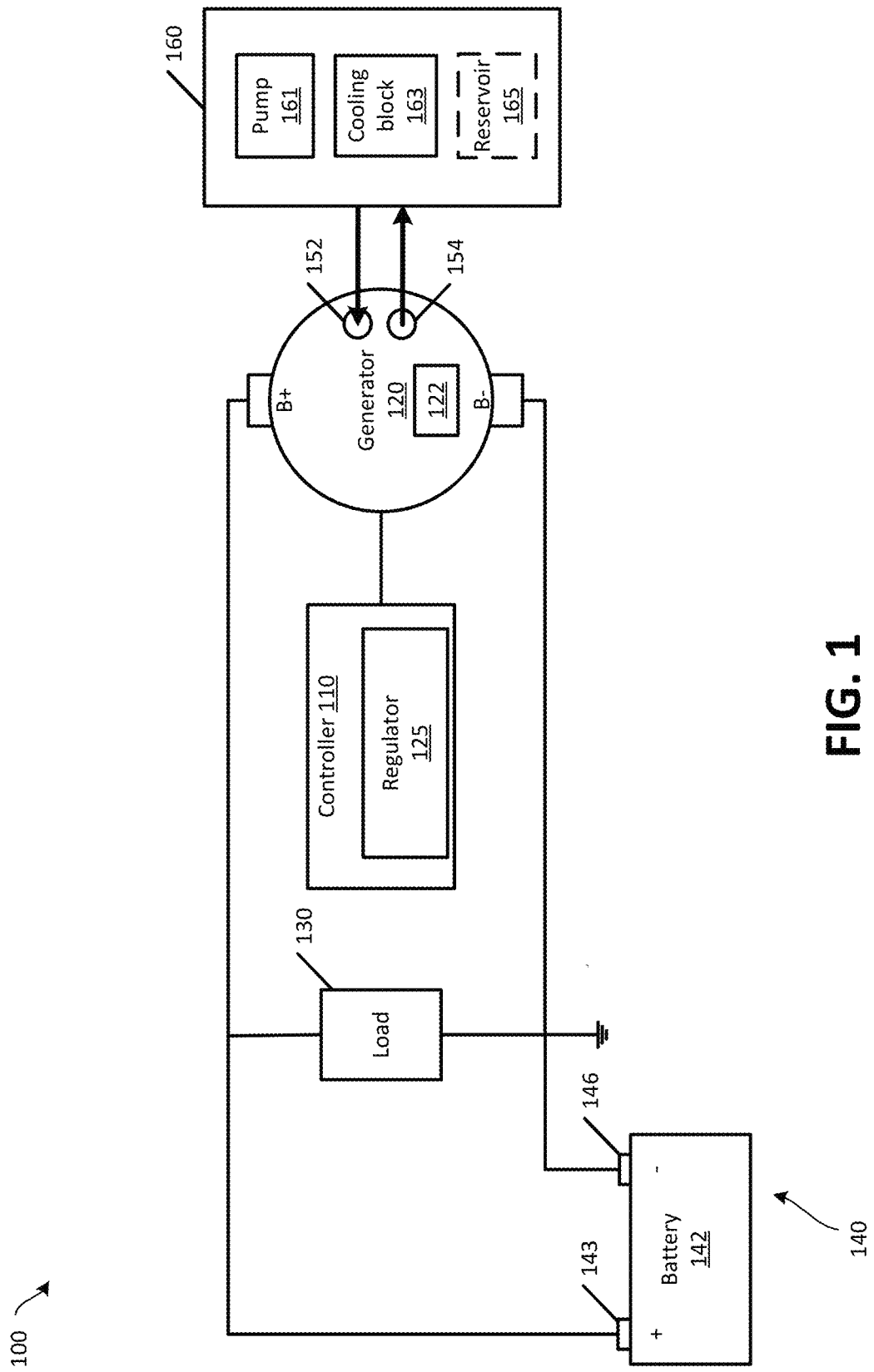
FIG. 1 shows an illustrative block diagram of a vehicle power system utilizing fluid cooling for a generator according to aspects of the disclosure.

FIG. 1 shows an illustrative block diagram of a vehicle power system 100 utilizing fluid cooling for a generator according to aspects of the disclosure. For example, the vehicle power system 100 may include a controller 110, a generator 120, an electrical load 130 receiving electrical power from the generator 120, a battery module 140 electrically coupled to the generator, and in some cases, one or more sensors. In some cases, the controller 110 may include a communication interface 114 and a processor 112. In some cases, the controller 110 may also include one or more memory devices (e.g., internal and/or external memory devices) that may be configured to store instructions 162 processed by the processor 112 to allow the controller to control the generator. For example, in some cases, the controller may process instructions to monitor a temperature of the generator for use in controlling operation of the generator 120 and/or operation of a cooling system 160, such as via controlling operation of a pump 161. The cooling system 160 may be configured to control heating of the generator 120 during operation. In some cases, the cooling system 160 may operate independently from the controller 110.

In some cases an alternator assembly may include an internal shaft driven pump (e.g., a gerotor pump) positioned next to the manifold ring. This pump may be configured to directly interface the feed port on the manifold. In some cases, the pump may provide flowrate control authority to the electronic regulator, such as by outfitting the internal flow bypass on the pump with a linear actuator. The regulator may be configured to control this actuator via pulse width modulation (PWM) to throttle the output flowrate into the heat exchanger. The electronic regulator may use a temperature input from a sensor mounted on the pressure side of the pump in calculations to determine the correct PWM duty cycle for the actuator.

In some cases, the generator 120 may be electrically coupled to the electrical load via two or more electrical connections (e.g., B+, B−, etc.) to provide electrical power to the electrical load 130. In an illustrative example, the generator 120 may be an alternator in a vehicle. In some cases, the generator 120 may be a stand-alone electrical generator configured to utilize another energy source (e.g., a fossil fuel engine, a wind turbine, etc.) to provide electrical energy to the electrical load 130. The generator 120 may include a field coil (not shown) and one more stator windings (not shown), where the field coil may generate a magnetic field when a field current flows through the field coils. This magnetic field may interact with the one or more stator windings to induce a voltage across one or more stators. The stator voltage may then be used to provide a generator output current for use in powering the electrical load 130.

In an illustrative example, the generator 120 may be an alternator installed in a vehicle, such as an automobile, a truck, a bus, a military vehicle, an airplane, a boat, and/or the like. Today, the electrical power requirements for such vehicles is increasing, due in part to an increase in electrical components included within the vehicle and/or that rely upon the vehicle electrical system as a power source. For example, the electrical load 130 may include one or more electrical components of the vehicle, such as a heating element, a cooling fan, headlights, an air conditioning unit, a pump, a radio, a battery module, and the like. In some cases, the vehicle alternator may also be used to provide power to one or more electrical devices (e.g., a portable electronic device, a mobile phone, a global positioning system (GPS) unit, etc.) and/or external vehicle components (e.g., a trailer, running lights, emergency lights, etc.). Some vehicles, such as emergency vehicles, which may include a number of electrical components that cannot be without power.

The battery module 140 may include at least one battery 142 and may be used to provide electrical power to the electrical load 130, or externally connected electrical devices, when sufficient electrical power is not or cannot be generated by the generator 120. For example, the battery module 140 may provide electrical energy to the electrical load when the vehicle's engine has been shut down, when the generator 140 has experienced a fault, when the electrical load 130 has increased to or beyond the generation capacity of the generator 120, and the like. In some cases, the generator 120 may be configured with two or more electrical terminals (e.g., a B+ terminal, a B− terminal, a B2+ terminal, etc.) to provide electrical power at one or more voltage levels.

In some cases, the generator 120 may be configured to generate alternating current (AC) voltages at a frequency corresponding to the rotation speed of the rotor. In many cases, this electrical energy is output as a rectified direct current (DC) voltage (e.g., via the B+ and B− terminals). In some cases, the generator 120 may be configured to output an AC voltage at a regulated frequency in addition to or in place of the DC output voltage, such as a 120V output at 60 Hz, 220V output at 50 Hz, and the like. To provide regulated DC voltages, the generator-based battery charging system 100 and/or the generator 120 may include a voltage regulator. The voltage regulator may operate to regulate the generator output voltage(s) at one or more pre-defined constant voltage levels as the speed of the generator 120 and electrical load 130 may vary during operation. For example, electrical devices included in the electrical load may be connected, disconnected, enabled, or disabled during operation of the generator 120. This variable load operation may cause disturbances (e.g., a voltage spike, a transient current, etc.) as the devices operate. In an illustrative example, a motor or heating element connected as at least a portion of the electrical load 130 may draw a large inrush current upon power up. These transient load conditions may affect the operation of the generator 120.

Additionally, in vehicular operations, the rotation speed of the rotor may correspond to the rotational speed of the vehicle's engine, where this variable rotational speed may cause the AC voltage generated via the interaction between the field coils and the rotor to be generated at a frequency with some variation. In such cases, the voltage regulator may be used to regulate the conversion of AC electrical energy to DC electrical energy at or near a predefined set point. In some cases, the regulator 125 may be incorporated into the generator 120, incorporated into the controller 110 as shown, or may be incorporated as an external device installed adjacent to the generator 120. In some cases, the regulator 125 may be configured to provide the regulated output voltage from the generator 120 via the B+ and B− terminals. While the regulator 125 and controller 110 are illustrated as being separate from the generator 120, components of the regulator 125 and/or the controller 110 may be integrated within a housing of the generator 120.

In some cases, the regulator may include one or more power electronic devices such as diodes, thyristors, silicon controlled rectifiers (SCRs), gate turn-on thyristors (GTOs), Triacs, bipolar junction transistors (BJTs), power transistors (e.g., insulated gate bipolar transistors (IGBTs), power metal oxide semiconductor field-effect transistors (MOSFETs), MOS controlled thyristors (MCTs), integrated gate-commutated thyristors (IGCT), and the like. The voltage regulator may include one or more converters, such as AC/DC converters, DC/DC converters and the like. For example, the regulator may include a rectifier 122 (e.g., a diode rectifier) to convert an AC input voltage to an unregulated DC voltage and a DC/DC regulator to convert the unregulated DC voltage to a regulated DC output voltage and/or current. In some cases, the regulator 125 may control an AC/DC converter to provide a regulated DC output voltage and/or current. The regulator 125 may be configured to switch one or more switching devices (e.g., an IGBT, a BJT, an SCR, an IGCT, etc.), along with additional electrical components (e.g., resistors, capacitors, inductors, transformers, etc.) to provide a regulated DC output via one or more power conversion circuits, such as a boost converter, a buck converter, a Cúk converter, a flyback converter, a single-ended primary-inductor converter (SEPIC) converter, a forward converter, a full bridge converter, and the like.

The generator 120 may be a based on a three-phase wound-field synchronous machine, with a rotor that may include at least one excitation coil. The stator may be composed of a slotted laminated iron core and a three-phase overlapped winding, that may be wye or delta connected. The rotor may include a number of poles (e.g., 12 poles, 14 poles, 16 poles, 18 poles, etc.), where the number of poles may correspond to a specified power output of the generator 120. For example, smaller vehicles (e.g., passenger vehicles) may use a smaller number of poles (e.g., 12 poles), while other vehicles with higher power requirements (e.g., trucks, buses, military vehicles, etc.) may have higher pole numbers (e.g., 14 poles, 18 poles, etc.). Often, the stator may be designed with one slot per pole and per phase, for example the stator may have 36 slots, 42 slots, 56 slots, etc. Increasing the number of poles reduces the inductance of the stator winding, however this also increases magnetic losses due to the higher electrical frequency. As such, a choice of pole number may be based on a compromise between the magnetic losses and alternator power requirements, if sufficient cooling cannot be provided. The form factor of the alternator housing factors into thermal dissipation calculations. Some air-cooled alternators (e.g., Lundell alternators) may be characterized by a form factor with a relatively large diameter size when compared to the alternator length to facilitate thermal dissipation. Direct contact cooling of alternators provides better cooling capability in a smaller form factor, however cooling capability may be affected by inadequate distribution of the cooling medium. As such, the concentric manifold ring assembly is advantageous for its ability to be scaled to fit inside large or small diameter units, regardless of the unit's length.

The generator 120 may also include the rectifier 122, such as diodes arranged in a full-bridge configuration to rectify the output current of the generator 120. The rectifier 122 may be divided into sets of diodes, where the sets of diodes may be within a casing that may be physically attached (e.g., press fit, welded, etc.) to a heatsink to improve thermal dissipation of heat produced by the rectifier 122. The regulator may include other electrical components, such as a half-bridge rectifier or ancillary diodes to improve the generator's performance under certain conditions, such as varying alternator speeds, ambient temperature of the vehicular cavity, chemical characteristics of the battery module 140, and the like. Generator efficiency may be related to mechanical losses (e.g., brush and bearing friction, losses created by a claw pole rotor, etc.), copper losses (e.g., stator copper losses, rectifier diode losses, regulator losses, contact resistance between slip rings and brushes, etc.), and magnetic losses.

Magnetic losses may be large at nominal excitation current and at lower speeds, due to a low output current when the stator is fully saturated due to the weak magnetic reaction. By increasing the speed and output current, while maintaining the same excitation current, flux density is reduced in the stator. As such, magnetic losses become proportional to speed itself rather than the square of speed during no-load conditions. Further, magnetic losses may also be proportional to lamination thickness. In some cases, portions of the rotor may be fabricated from solid iron, so that eddy currents can easily circulate, adding to the magnetic losses at low speeds and low loads. Similarly, at higher speeds, the stator magneto-motive force (MMF) may produce space harmonic fields in the air-gap between the rotor and the stator, which may be augmented by the slot openings to produce eddy currents. Each of these losses may result in generation of waste thermal energy to be dissipated.

Thermal dissipation within a generator may typically be performed by convection via a cooling fluid (e.g., air, engine coolant, oil, etc.) circulating within or around the alternator housing, where rotor bearings may dissipate at least a portion of heat generated in the rotor. In the illustrative system 100, a cooling system 160 may be physically connected to the generator via an inlet port 152 and an outlet port 154 to facilitate delivery and retrieval of cooling fluid (e.g., oil, etc.) from the interior of the generator 120. For example, the pump 161 may pump the fluid from one or both of a cooling block 163 (e.g., a radiator or other heat exchanging device) into an interior cavity of the generator 120, where heated fluid returns to the cooling system 160 from the interior cavity of the generator 120 via the outlet port 154. In some cases, a heat exchanger may be integrated into the alternator housing. For example, an integrated heat exchange may be physically mounted to the alternator, such as at the anti-drive end. Alternatively, an externally mounted heat exchange may be fluidly coupled to the alternator by fluid lines (e.g., flexible fluid lines, rigid fluid lines, or the like). In some cases, a fluid reservoir 165 may be incorporated into the cooling system 160.

Figure 2A:
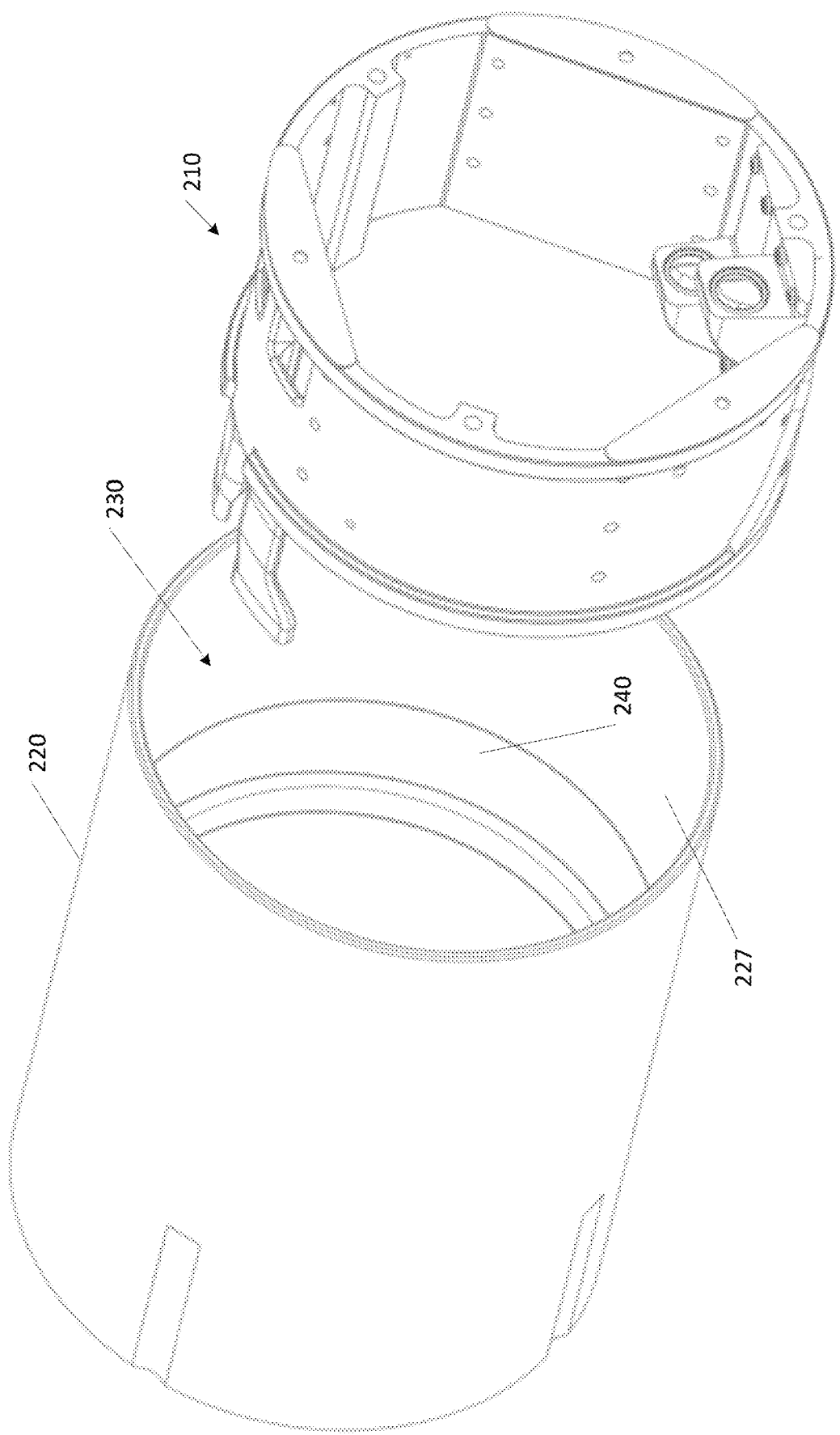
FIG. 2A shows an exploded view of an alternator housing and a concentric manifold ring assembly according to aspects of the disclosure.
Figure 2B:
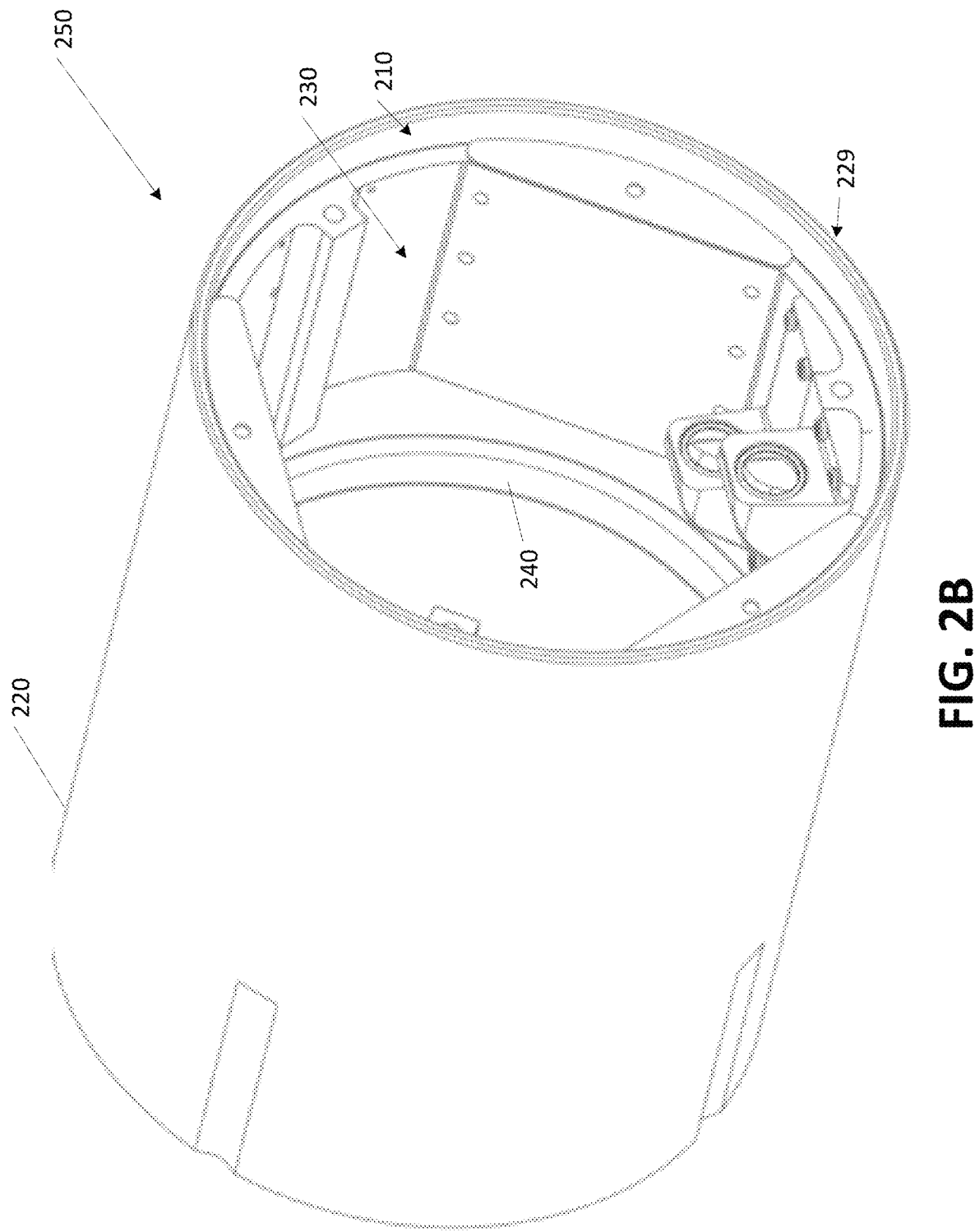
FIG. 2B shows an illustrative view of the concentric manifold ring assembly installed within the alternator housing according to aspects of the disclosure.

FIG. 2A shows an exploded view of an alternator housing (e.g., housing 220) and a concentric manifold ring assembly 210 according to aspects of the disclosure. The housing 220 may be fabricated of aluminum or another similar non-magnetic material. Aluminum is often used as a housing material for its strength to weight ratio, because it does not magnetize, and for its thermal conductivity properties to improve heat dissipation. An advantage of the concentric manifold ring assembly 210 is that it may be inserted, or pressed, into an interior cavity 230 of the housing 220 as a complete unit to be adjacent to a surface of the stator assembly 240, as shown with the generator assembly 250 of FIG. 2B Once inserted, the complete concentric internal flow paths may be formed between an interior surface of the housing 220 and exterior surfaces of the concentric manifold ring assembly 210, as discussed below.

Figure 3:
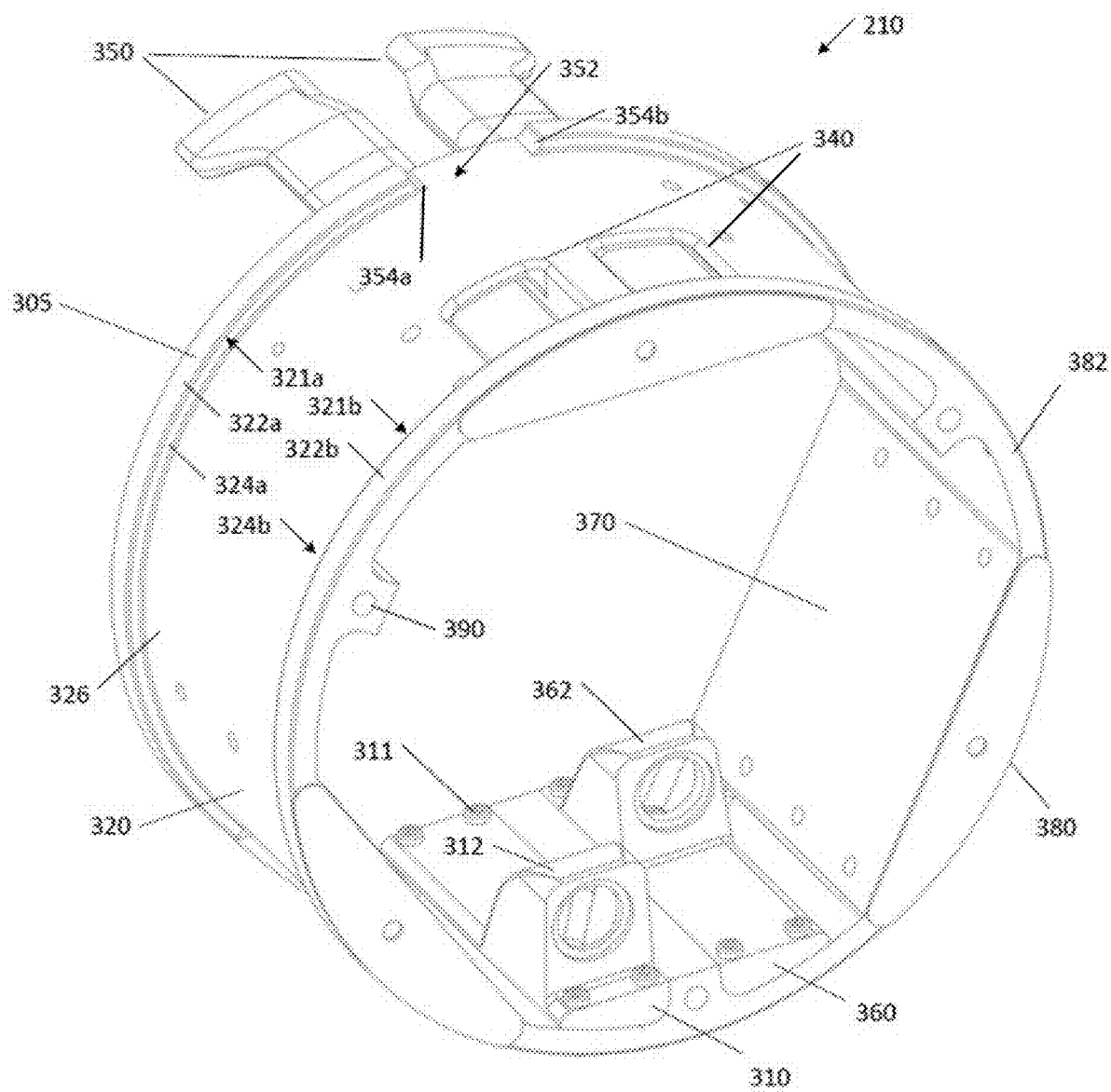
FIGS. 3 and 4 show illustrative perspective views of the manifold ring assembly according to aspects of the disclosure.
Figure 4:
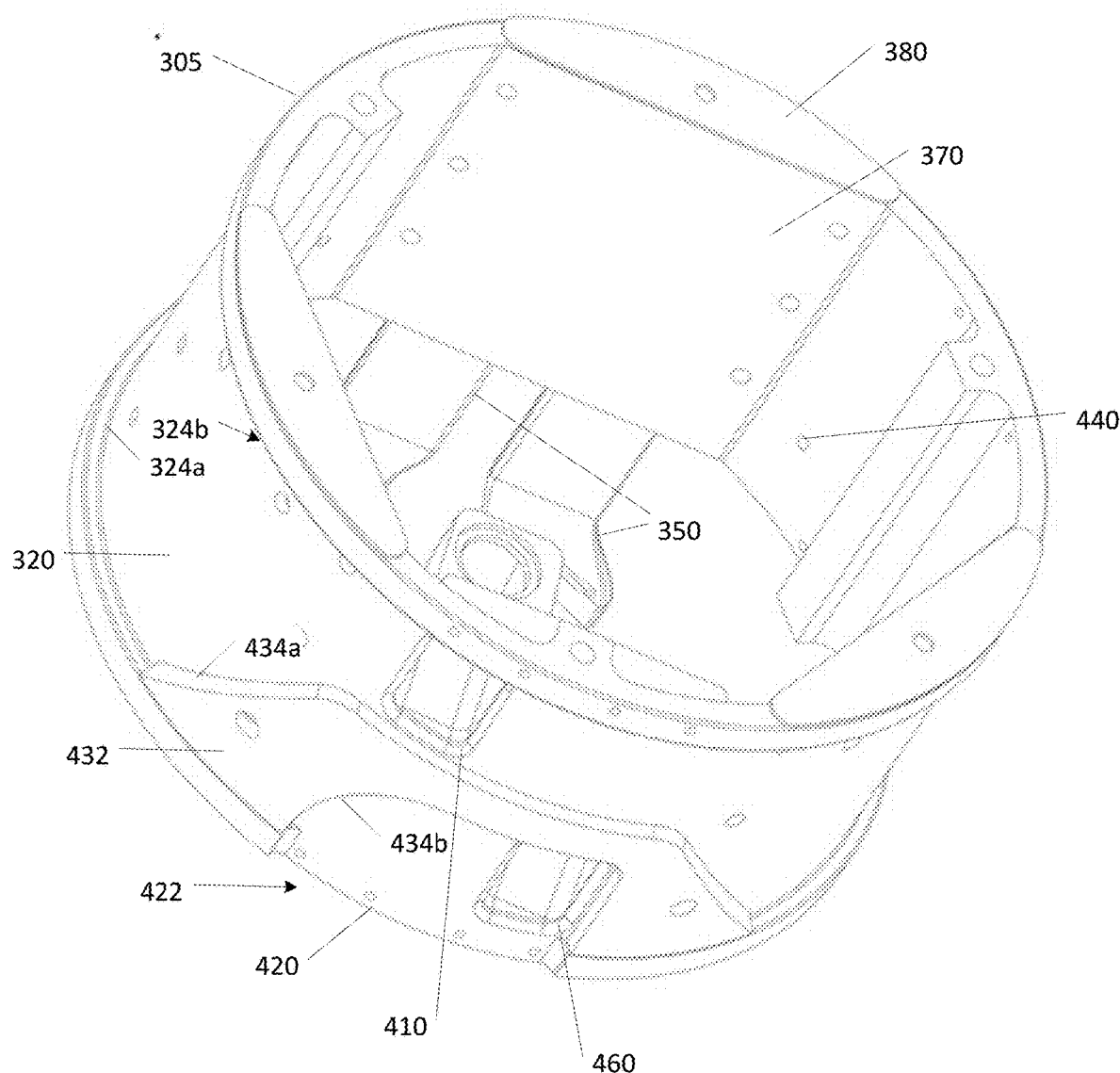

FIGS. 3 and 4 show illustrative perspective views of the concentric manifold ring assembly 210 according to aspects of the disclosure. The concentric manifold ring assembly 210 may include a carrier ring 305 upon which other components may be attached. Additionally, the carrier ring 305, when the concentric manifold ring assembly 210 is pressed into the housing 220 forms a portion of each of a feed flow channel and a return flow channel to facilitate delivery of the coolant fluid within the interior of the generator 120. For example, the carrier ring includes a first protrusion 321a having a first upper surface 322a and a second protrusion 321b having a second upper surface 322b. The first protrusion 321a extends upward from an exterior surface 326 of the carrier ring 305 at a first edge of the carrier ring 305, where the first protrusion extends around the circumference of the carrier ring 305 along the first edge. The second protrusion 321b extends upward from the exterior surface 326 of the carrier ring 305 at a second edge of the carrier ring 305, where the second edge is opposite the exterior surface 326 from the first edge. The second protrusion 321b extends along the circumference of the carrier ring 305 along the second edge.

When the concentric manifold ring assembly 210 is pressed into the housing 220, the first protrusion 321a is positioned adjacent the stator assembly 240 within the interior cavity 230 of the housing 220 and the second protrusion 321b is positioned adjacent an exterior edge 229 of the housing 220. Additionally, the first upper surface 322a and the second upper surface 322b are in contact with an interior surface 227 of the housing 220 with a mechanical tolerance of at least a clearance fit, a transitional fit, or an interference fit, thus forming one or more leak-minimizing flow channels for coolant flow. A fit tolerance may be determined based on a combination of factors, such as manufacturability, leak minimization, and ease of assembly, among others. In an illustrative example, a clearance fit may be designed with a particular tolerance range (e.g., between about 0.002 in.-0.004 in.) may be chosen to balance these factors, so that the installed concentric manifold ring assembly 210 may experience a negligible amount of leakage when compared to the expected flow rate. For example, a concentric feed flow channel 320 is formed between the interior surface 227 of the housing 220 the exterior surface 326 of the carrier ring 305, a first sidewall surface 324a of the first protrusion 321a, and a second sidewall surface 324b of the second protrusion 321b. The concentric manifold ring assembly 210 further includes a feed port adapter 310 and a return port adapter 360. The feed port adapter 310 and the return port adapter 360 may be removably attached to the carrier ring 305 such as by using fasteners 311. The feed port adapter 310 may include a feed inlet 312 configured to receive a fluid flow coupling to allow inflow of a fluid and forms an input of the concentric feed flow channel 320. The return port adapter 360 may include a return outlet 362 to facilitate a return flow of the fluid via a return flow channel 420 from the interior cavity of the generator 120. Dimensions of the flow channel may be determined, for example, to maintain a cross-sectional area (e.g., about 0.40-0.75 in$^2$.) of the inlet of the feed port adapter 310 and/or the outlet of the return port adapter 360 and/or attached pipes or hoses. In some cases, the flow channels may be designed with a larger cross-sectional area, such that a static pressure of the system may be minimized to reduce energy required to establish proper volume flowrates. In some cases, dimensions of components of the concentric manifold ring assembly 210 may be determined based on a size of components to be attached. For example, an overall width of the concentric manifold ring assembly 210 may be determined based on dimensions of rectifiers to be used.

Fluid flow to the interior of the generator 120 is facilitated via one or more openings in the carrier ring 305 located opposite the carrier ring 305 from the location of the feed port adapter 310. For example, one or more duct ports 340 are formed through the exterior surface 326 of the carrier ring 305 and a rear opening 352 is formed between a third edge 354a and a fourth edge 354b through the first protrusion 321a, where the rear opening is adjacent to the duct ports 340. The duct ports 340 fluidly connect the feed flow channel 320 to one or more axial flow ducts 350 that facilitate fluid flow over the stator assembly 240 and towards the rear of the housing 220. Additional fluid flow from the feed flow channel 320 towards the stator assembly 240 and the rear of the housing 220 is provided via the rear opening 352.

The concentric manifold ring assembly 210 further includes one or more rectifier mounting surfaces 370 and one or more flow caps 380. In some cases, the rectifier mounting surface 370 may be integrated into the carrier ring 305, such as being a part of an extruded aluminum blank. In some cases, the rectifier mounting surface 370 may be removable and physically affixed (e.g., via fasteners, epoxy, welding, etc.) to provide a thermally conductive surface upon which a rectifier module may be mounted. For example, the rectifier mounting surface may comprise copper or aluminum panel to facilitate thermal transfer from the rectifier module. Additionally, the flow cap 380 may physically attach to a front surface 382 of the carrier ring 305, where the front surface faces an exterior of the housing 220 when the concentric manifold ring assembly 210 is fit within the housing 220. The flow cap 380 may form a fluid flow barrier for fluid flow providing back cooling to the rectifier mounting surface(s) 370 and/or for form a fluid flow barrier to facilitate fluid flow out of the axial flow ducts 350. The carrier ring 305 includes one or more openings 390 to facilitate connection with an alternator housing end unit (not shown) to complete the housing enclosure. Fluid inlet and outlet ports may extend through the alternator housing end unit to fluidly connect the feed port adapter 310 and the return port adapter 360 with the cooling system 160.

Turning to FIG. 4, a feed port 410 is formed through the carrier ring 305 to allow inflow of fluid from the feed port adapter 310 to the feed flow channel 320. The feed flow channel 320 extends bidirectionally from the feed port 410 to allow circumferential fluid flow bidirectionally around the carrier ring 305. A return port 460 is formed through the carrier ring 305 to fluidly connect the return flow channel 420 to the return port adapter 360. A feed/return flow divider 430 is positioned between the feed port 410 and the return port 460 to provide separation between the feed flow channel 320 and the return flow channel 420. To ensure separation of the feed flow channel 320 and the return flow channel 420, an upper surface 432 of the feed/return flow divider 430 is aligned with the first upper surface 322a of the first protrusion 321a and is configured to contact the interior surface 227 of the housing 220 with a similar mechanical tolerance. An interior surface 434a of the feed/return flow divider 430 and the second sidewall surface 324b defines the feed flow channel 320 adjacent to the feed port 410. An exterior surface 434b of the feed/return flow divider 430 abuts the first sidewall surface 324a adjacent to edges of an opening 422 through the first protrusion 321a to form the return flow channel 420 adjacent to the return port 460.

The carrier ring 305 may include one or more jet ports 440 to fluidly connect the feed flow channel 320 with an interior of the carrier ring 305. Each jet port 440 may provide fluid flow (e.g., a fluid jet, a radial fluid flow, etc.) to splash or otherwise direct fluid to a component, such as a rotating rectifier mounted on the rotor shaft, an upper surface of a rectifier module affixed to the rectifier mounting surface 370, a mounting plate, etc. For example, the jet port 440 illustrated in FIG. 4 may direct fluid flow towards a rotating rectifier mounted on the rotor or towards a rectifier mounted on the rectifier mounting surface 370 opposite the carrier ring 305 from the jet port 440.

Figure 5:
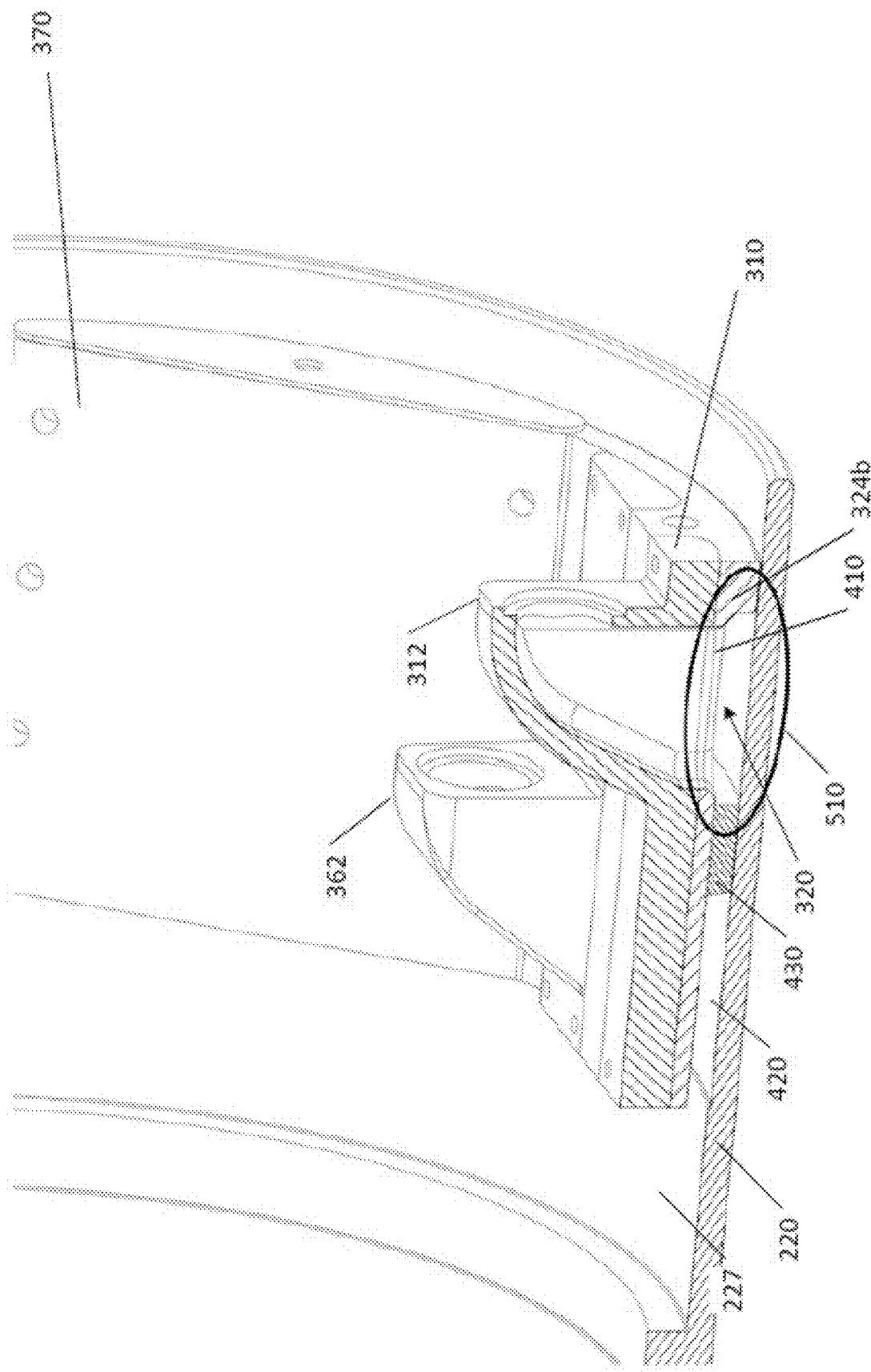
FIG. 5 shows a cross-sectional view of an installed manifold ring assembly according to aspects of the disclosure.

FIG. 5 shows a cross-sectional view of an installed manifold ring assembly according to aspects of the disclosure. As shown, the circled portion 510 highlights the formation of the feed flow channel 320 between the feed port adapter 310 via the feed port 410, where the feed flow channel is defined between the interior surface 227 of the housing 220, the second protrusion 321b and the feed/return flow divider 430.

Figure 6:
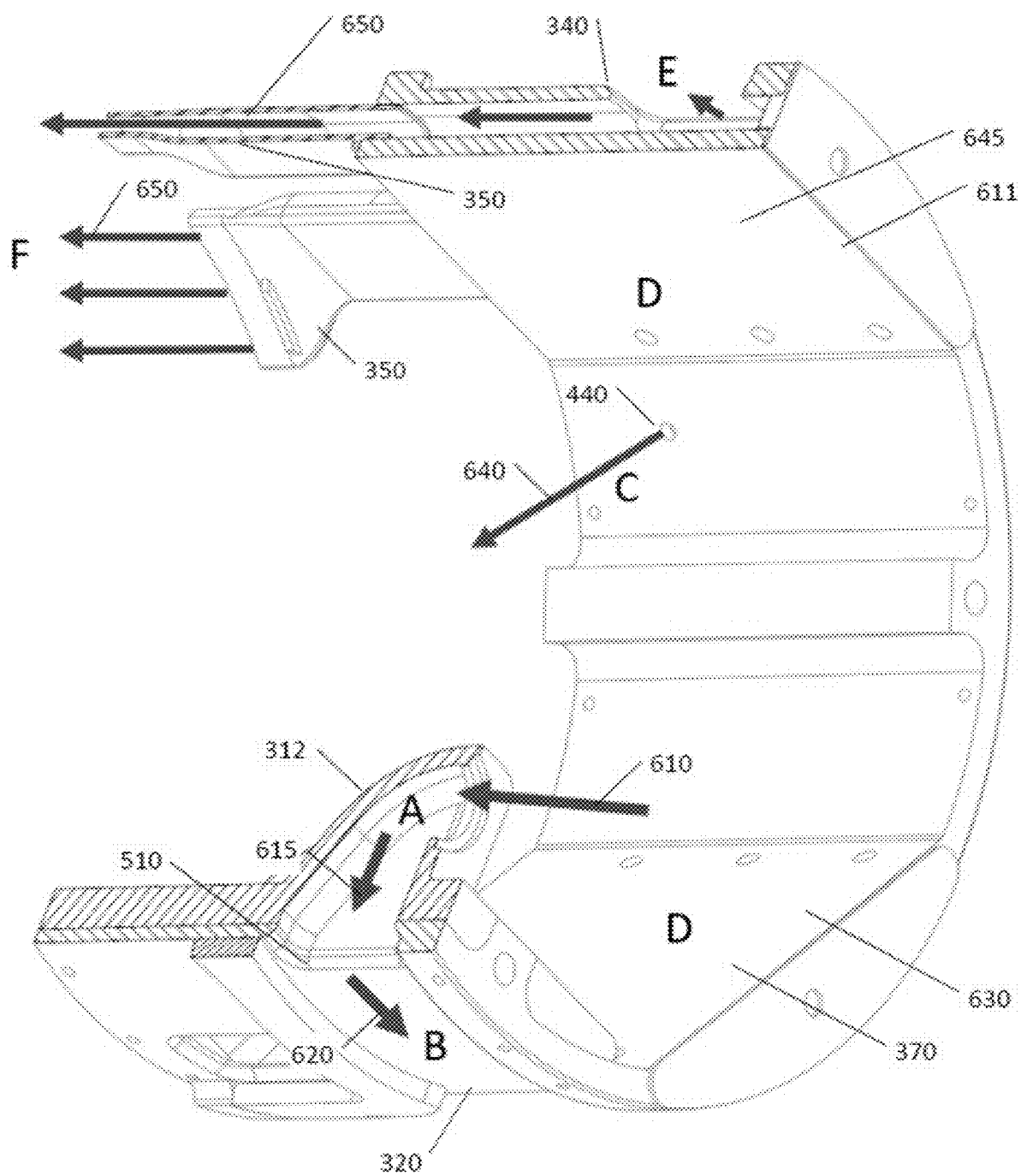
FIGS. 6 and 7 show illustrative fluid flow with respect to cross-sectional views of manifold ring assembly according to aspects of the disclosure.
Figure 7:
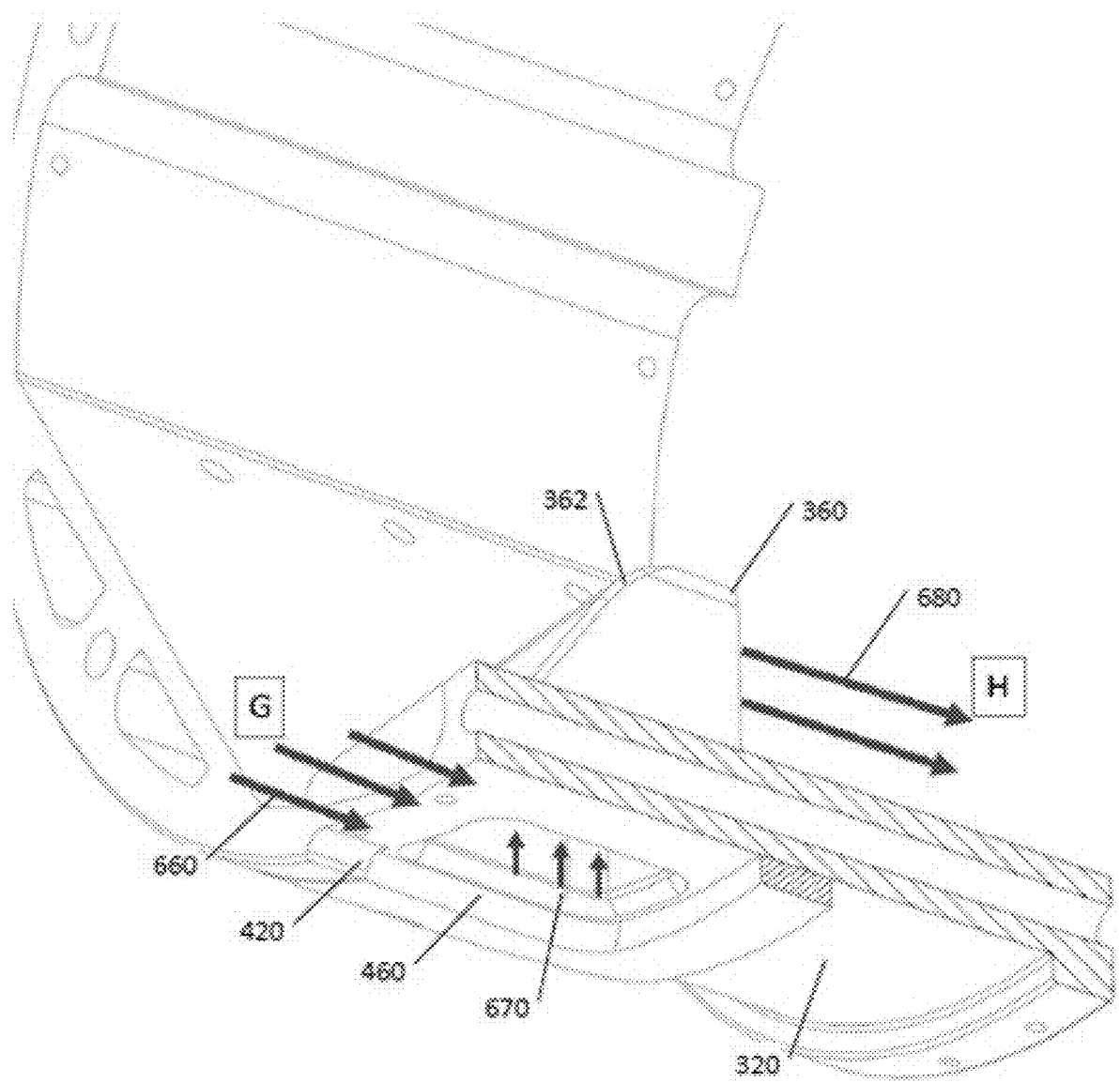

FIGS. 6 and 7 show illustrative fluid flow with respect to cross-sectional views of concentric manifold ring assembly 210 according to aspects of the disclosure. At A, an input fluid flow 610 enters the feed port adapter 310 and forms a feed flow 615 through the feed inlet 312 towards the feed port 410 to flow 620 along the feed flow channel 320. While the cross-sectional view of FIG. 6 only illustrates flow in one direction, the flow 620 is bidirectional around the concentric manifold ring assembly 210. At 440, a portion of the feed flow 615 is diverted through the jet port 440 into a fluid jet 640 directed towards an opposite rectifier mounting surface 370. Fluid flow continues through the duct ports 340 to provide axial fluid flow 650 out of the axial flow ducts 350 that is directed towards a rear surface of the alternator housing.

FIG. 7 illustrates return fluid flow from the interior of the housing 220. Fluid flow 660 enters the return flow channel 420 of the concentric manifold ring assembly 210 and flows 670 through the return port 460 to the return outlet 362 and flow 680 exits the return port adapter 360 to return to the cooling system for heat exchange. In some cases, the pump 161 pumps fluid into the feed port adapter 310 and/or pulls fluid from the return port adapter 360.

Figure 8:
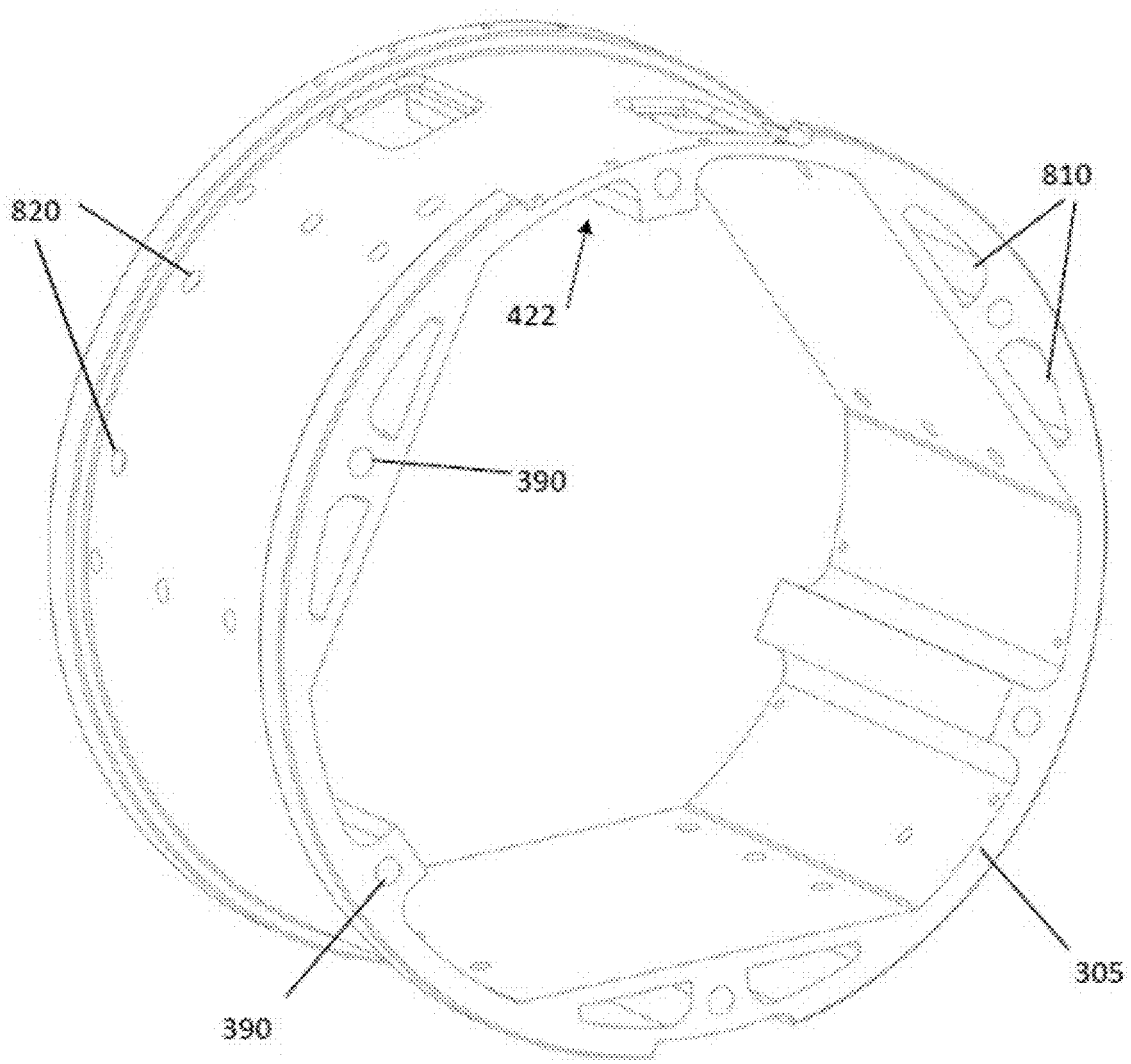
FIG. 8 shows an illustrative view of a carrier ring of the manifold ring assembly according to aspects of the disclosure.

FIG. 8 shows an illustrative view of a carrier ring 305 of the concentric manifold ring assembly 210 according to aspects of the disclosure. Fluid flow for providing cooling of the rectifiers may be facilitated by diverting a portion of the fluid flow from the feed flow channel 320 to contact a bottom surface opposite to the rectifier mounting surface 370. Here, the feed flow channel 320 may be fluidly connected to one or more rectifier cooling cavities 810 via one or more ports 820. At least a portion of concentric fluid flow in the feed flow channel 320 may be diverted to a rectifier cooling cavity 810 via the one or more ports 820. The flow cap 380, as shown in FIG. 3, prevents the coolant fluid from flowing out towards the exterior of the alternator. The opposite side of the rectifier cooling cavity 810 is open to allow drainage of the fluid. Fluid within the rectifier cooling cavity 810 may collect at least a portion of the thermal energy of the rectifiers transferred via the rectifier mounting surface 370. The draining fluid may flow in a direction of the centrally mounted return flow channel 420 to be pulled into the external heat exchanger. In some cases, the rectifier mounting surface 370 may include openings, or 'windows' (not shown) that allow cooling fluid within the rectifier cooling cavity 810 to come in direct contact with a rectifier surface.

Figure 9:
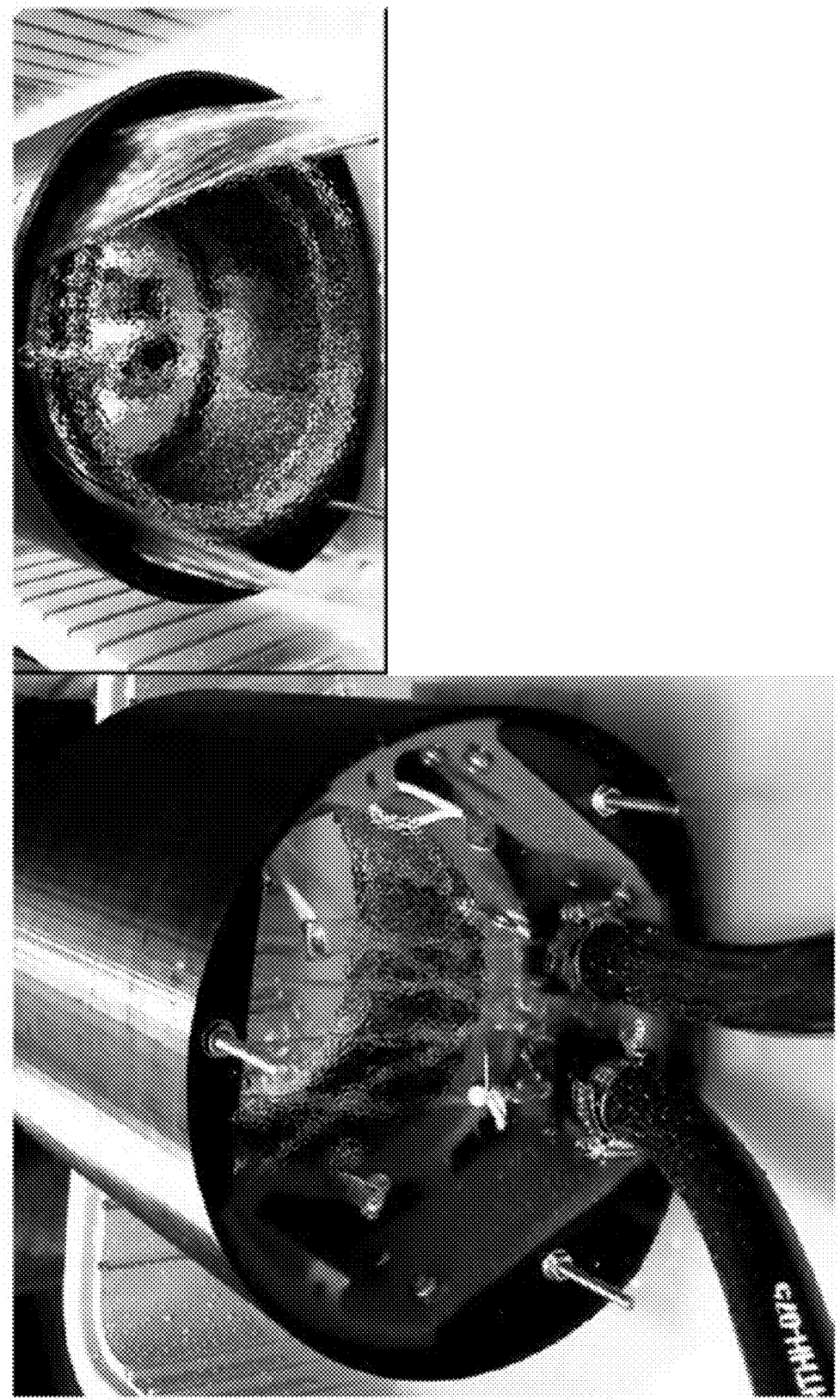
FIG. 9 shows an illustrative fluid flow testing of an illustrative stator assembly including the concentric manifold ring assembly according to aspects of the disclosure.
Figure 10:
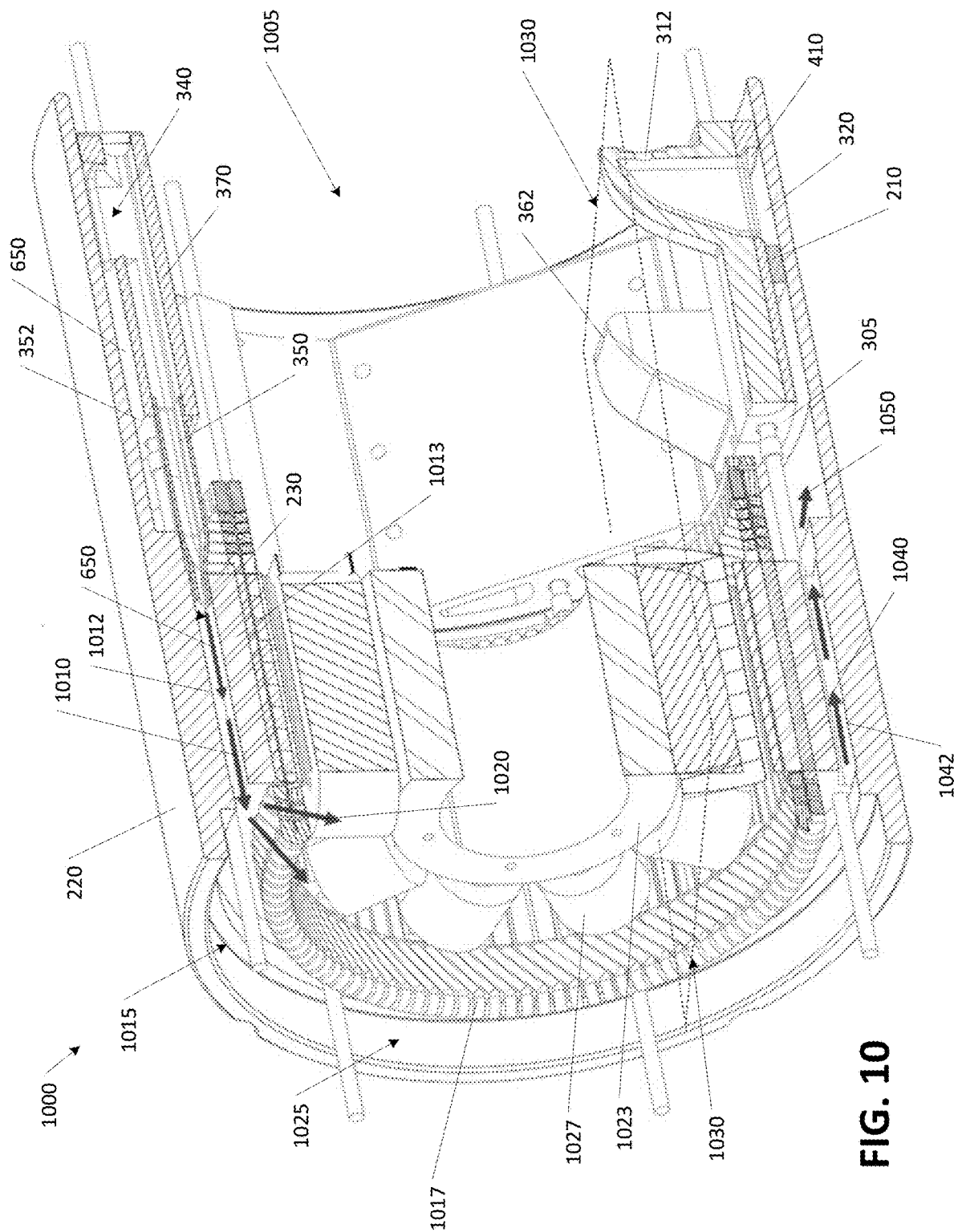
FIG. 10 shows an illustrative cross-sectional view of an illustrative alternator assembly according to aspects of the disclosure.

FIG. 9 shows an illustrative fluid flow testing of an illustrative stator assembly including the concentric manifold ring assembly according to aspects of the disclosure. FIG. 10 shows an illustrative cross-sectional view of an illustrative alternator assembly 1000, with end covers (not shown) removed, according to aspects of the disclosure. The alternator assembly 1000 comprises the housing 220, the concentric manifold ring assembly 210, a stator assembly 1013 and a rotor assembly 1023. The stator assembly 1013 and the rotor assembly 1023 may function as at least a partial flow barrier that divides the interior cavity 230 of the housing 210 into two cavities (e.g., an anti-drive-end cavity 1005 and a drive-end cavity 1025), where each of the anti-drive-end cavity 1005 and the drive-end cavity 1025 are located on opposite sides of the stator assembly-rotor assembly stack. As mentioned above, the fluid flow 650 exiting the concentric manifold ring assembly 210 via the axial flow ducts 350 may form a fluid flow 1010 directed, via a flow channel (e.g., channel 1012), from the concentric manifold ring assembly 210 located in the anti-drive-end cavity 1005 to the drive-end cavity 1025. In some cases, additional fluid flow may exit the concentric manifold ring assembly 210 via the rear opening 352 within the anti-drive-end cavity to flow over one or more stator components and/or rotor components adjacent to the concentric manifold ring assembly 210.

The fluid flow 650 out of the axial flow ducts 350 flows axially away from the concentric manifold ring assembly 210, past the stator assembly 1013 via a select pair of circumferentially positioned axial flow channels (e.g., channel 1012) formed by the stator laminations and housing. The fluid flow 1010 moves to the opposite side of the main stator, creating an active end-to-end circulation of chilled fluid within the alternator to absorb thermal energy from alternator components. The term "active end-to-end circulation" is intended to describe the act of directing the bulk of the chilled dielectric coolant, which is received via the feed port adapter 310, to cool a portion of the drive-end of the stator assembly 1013. The resulting fluid flow 1010 then may enter the drive-end cavity 1025 coolant to flow (e.g., fluid flow 1020) into the drive-end cavity before flowing back towards the anti-drive-end through other circumferentially positioned axial channels (e.g., channel 1042) formed by the stator laminations and the housing. The fluid flow 1020 may, during a period of high fluid flow may contact the end portion of the housing (not shown) and may cause some splash-back onto the windings/rotor. In some cases, fluid flow 1020 may at least partially form a "waterfall" effect over the stator hairpins 1017 and/or rotor windings 1027 at lower flow rates. In some cases, the fluid flow 1020 may supplement and/or enhance an effect of shaft fling. In doing so, a stagnation effect on level terrain, and a starvation effect on inclines may be prevented.

When installed in a vehicle, the fluid cooled alternator may be positioned such that the axial flow duct 350 may be mounted towards a top of the alternator, where such a high mounted duct allows fluid to flow axially over the top of the stator. The fluid may then extract heat from channels, e.g., channel 1012, formed by the laminations and the exterior housing. Fluid flows over the edge of the stator onto hairpins and/or other windings and may flow down to a pool of dielectric fluid 1030 at the bottom of the interior cavity. The pooled dielectric coolant may move in a fluid flow 1040 through channels, e.g., channel 1042, in the stator assembly from the drive-end cavity back to an output fluid flow 1050 via the return outlet 362 of the return port adapter 360 located on the anti-drive end cavity 1005.

While this disclosure describes in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed is:

1. A concentric manifold assembly for a rotating machine, comprising:
a flow inlet configured to receive incoming fluid flow;
a first flow path concentric with the concentric manifold assembly;
a carrier ring forming a concentric portion of the first flow path;
a rectifier mounting plate;
an outlet positioned opposite the carrier ring from a location of a rectifier mounting plate, wherein the outlet is configured to direct a portion of fluid from a concentric flow around the carrier ring via the first flow path to a radial flow directed towards an interior volume of the concentric manifold assembly;
an axial flow duct directing fluid flow from concentric flow within the concentric manifold assembly to axial flow within a housing of a generator and concentric with and surrounding the concentric manifold assembly; and
a flow outlet configured to receive fluid returning axially from within the housing.

2. The concentric manifold assembly of claim 1 for the rotating machine, wherein the flow inlet comprises an inlet assembly and the flow outlet comprises an outlet assembly.

3. The concentric manifold assembly for the rotating machine of claim 2, wherein each of the inlet assembly and the outlet assembly are removably attached to the concentric manifold assembly.

4. The concentric manifold assembly for the rotating machine of claim 1, comprising sidewalls of the carrier ring forming at least a portion of the first flow path.

5. The concentric manifold assembly for the rotating machine of claim 4, wherein the concentric portion of the first flow path is formed between an outer surface of the carrier ring and an interior surface of the housing.

6. The concentric manifold assembly for the rotating machine of claim 1, wherein the axial flow duct is removably attached to a carrier ring comprising at least a portion of the first flow path.

7. The concentric manifold assembly for the rotating machine of claim 1, wherein the rectifier mounting plate is formed as a part of the concentric manifold assembly.

8. The concentric manifold assembly for the rotating machine of claim 1, wherein at least a portion of the concentric manifold assembly is formed from a thermally conductive material.

9. The concentric manifold assembly for the rotating machine of claim 1, wherein a portion of the carrier ring that forms the first flow path guides a first fluid flow along the first flow path adjacent to a housing of the rotating machine, wherein the first fluid flow is received from a fluid supply; and
 wherein the axial flow duct is configured to direct fluid from the concentric flow of the first flow path to the axial flow of a second flow path, wherein the second flow path is in an axial direction of the rotating machine.

10. The concentric manifold assembly for the rotating machine of claim 9, comprising an inlet assembly and an outlet assembly, wherein the inlet assembly is fluidly connected to the first flow path and the outlet assembly is fluidly connected to the second flow path.

11. The concentric manifold assembly for the rotating machine of claim 9, wherein the rectifier mounting plate is thermally connected to a rectifier module mounted to the rectifier mounting plate.

12. The concentric manifold assembly for the rotating machine of claim 11, wherein a third flow path comprises a fluid flow between a radial flow jet along the first flow path and a component mounted to the rectifier mounting plate.

13. The concentric manifold assembly for the rotating machine of claim 11, wherein at least a portion of the first flow path is defined by an exterior surface of the carrier ring, an interior surface of the housing, and interior side surfaces of the carrier ring.

14. The concentric manifold assembly for the rotating machine of claim 11, wherein at least a portion of the second flow path is formed between an exterior surface of the carrier ring and an interior surface of the housing.

15. The concentric manifold assembly for the rotating machine of claim 9 further comprising:
 a feed port adapter adjacent a feed port through the carrier ring; and
 a return port adapter adjacent a return port through the carrier ring.

16. The concentric manifold assembly for the rotating machine of claim 15, comprising a divider located between the feed port and the return port, wherein a first edge of the divider forms a portion of the first flow path and a second edge forms a portion of the second flow path, wherein the second flow path is opposite the divider from the first edge.

17. The concentric manifold assembly for the rotating machine of claim 1,
 wherein the carrier ring comprises:
  an input flow adapter;
  an output flow adapter, wherein the output flow adapter is physically adjacent to the input flow adapter;
  an upper surface;
  a first protrusion from the upper surface, the first protrusion located adjacent a first edge of the carrier ring;
  a second protrusion from the upper surface, the second protrusion located adjacent a second edge of the carrier ring, wherein the second edge is opposite the first edge, wherein the upper surface, the first protrusion, and the second protrusion form a flow channel along an outer edge of the carrier ring and wherein the flow channel is concentric with the carrier ring and is enclosed by a housing; and
 wherein the axial flow duct fluidly connects the flow channel to an interior space within the housing of the rotating machine, wherein the axial flow duct directs fluid received via the concentric flow within the manifold via the flow channel to the axial flow away from the carrier ring, wherein the axial flow is within the housing.

18. The concentric manifold assembly for the rotating machine of claim 17, further comprising the housing.

19. The concentric manifold assembly for the rotating machine of claim 1, comprising a radial flow jet located along the first flow path, wherein the radial flow jet is configured to direct a portion of the concentric flow of the first flow path to a radial flow directed in a third flow path.

* * * * *